(12) United States Patent
Tian et al.

(10) Patent No.: US 11,126,314 B2
(45) Date of Patent: Sep. 21, 2021

(54) TOUCH SUBSTRATE, TOUCH CONTROL DISPLAY APPARATUS, AND METHOD OF FABRICATING A TOUCH SUBSTRATE

(71) Applicants: BOE TECHNOLOGY GROUP CO., LTD., Beijing (CN); Hefei Xinsheng Optoelectronics Technology Co., Ltd., Anhui (CN)

(72) Inventors: Jian Tian, Beijing (CN); Ming Zhang, Beijing (CN); Tsungchieh Kuo, Beijing (CN); Shifeng Xu, Beijing (CN); Xujie Zhang, Beijing (CN); Tengfei Zhong, Beijing (CN); Min He, Beijing (CN); Xiaojuan Hu, Beijing (CN); Jing Wang, Beijing (CN); Xinbin Tian, Beijing (CN)

(73) Assignees: BOE TECHNOLOGY GROUP CO., LTD., Beijing (CN); Hefei Xinsheng Optoelectronics Technology Co., Ltd., Anhui (CN)

( * ) Notice: Subject to any disclaimer, the term of this patent is extended or adjusted under 35 U.S.C. 154(b) by 71 days.

(21) Appl. No.: 16/065,029

(22) PCT Filed: Jun. 22, 2017

(86) PCT No.: PCT/CN2017/089545
§ 371 (c)(1),
(2) Date: Jun. 21, 2018

(87) PCT Pub. No.: WO2018/232692
PCT Pub. Date: Dec. 27, 2018

(65) Prior Publication Data
US 2021/0208730 A1   Jul. 8, 2021

(51) Int. Cl.
*G06F 3/041* (2006.01)
*G06F 3/044* (2006.01)

(52) U.S. Cl.
CPC .......... *G06F 3/0445* (2019.05); *G06F 3/0446* (2019.05); *G06F 3/04164* (2019.05);
(Continued)

(58) Field of Classification Search
CPC combination set(s) only.
See application file for complete search history.

(56) References Cited

U.S. PATENT DOCUMENTS 9,628,115 B1    4/2017   Tsai et al.
2009/0160820 A1  6/2009   Chiu et al.
(Continued)

FOREIGN PATENT DOCUMENTS

CN    103019451 A    4/2013
CN    103677406 A    3/2014
(Continued)

OTHER PUBLICATIONS

International Search Report & Written Opinion dated Mar. 28, 2018, regarding PCT/CN2017/089545.
(Continued)

*Primary Examiner* — Deeprose Subedi
(74) *Attorney, Agent, or Firm* — Intellectual Valley Law, P.C.

(57) ABSTRACT

The present application discloses a touch substrate having a touch electrode area and a peripheral area. The touch substrate includes a base substrate and a mesh conductive layer in the peripheral area of the touch substrate. The mesh conductive layer is configured to be connected to ground to discharge electrostatic charge in the touch substrate.

19 Claims, 9 Drawing Sheets

(52) U.S. Cl.
CPC ............ *G06F 2203/04103* (2013.01); *G06F 2203/04111* (2013.01); *G06F 2203/04112* (2013.01)

(56) References Cited

U.S. PATENT DOCUMENTS

| | | |
|---|---|---|
| 2012/0075218 A1 | 3/2012 | Chen et al. |
| 2014/0111442 A1 | 4/2014 | Burberry et al. |
| 2014/0375910 A1 | 12/2014 | Tada et al. |
| 2016/0103548 A1 | 4/2016 | Jun |
| 2017/0262091 A1 | 9/2017 | Wang et al. |
| 2018/0136768 A1* | 5/2018 | Tanaka .................. G06F 3/0445 |
| 2018/0190598 A1 | 7/2018 | Xie et al. |

FOREIGN PATENT DOCUMENTS

| | | |
|---|---|---|
| CN | 105824461 A | 8/2016 |
| CN | 105932011 A | 9/2016 |

OTHER PUBLICATIONS

Extended European Search Report in the European Patent Application No. 17879659.5, dated Dec. 17, 2020.

* cited by examiner

Related Art

TOUCH SUBSTRATE, TOUCH CONTROL DISPLAY APPARATUS, AND METHOD OF FABRICATING A TOUCH SUBSTRATE

CROSS-REFERENCE TO RELATED APPLICATION

This application is a national stage application under 35 U.S.C. § 371 of International Application No. PCT/CN2017/089545, filed Jun. 22, 2017, the contents of which are incorporated by reference in the entirety.

TECHNICAL FIELD

The present invention relates to touch control technology, more particularly, to a touch substrate, a touch control display apparatus, and a method of fabricating a touch substrate.

BACKGROUND

In recent years, touch apparatuses have been widely used in many electronic devices such as mobile phones, computer display panels, touch screens, satellite navigation devices, digital cameras, etc. Examples of touch apparatuses include a mutual capacitive touch control device and a self-capacitive touch control device. In a mutual capacitive touch control device, the touch electrode can be a touch driving electrode (Tx), whereas the touch sensing electrode (Rx) can be disposed on the color filter substrate. In a self-capacitive touch control device, the touch electrode can achieve touch control function alone.

When a finger of a user performs touch control functions on a touch panel, electrostatic charges accumulate on the touch panel. When the electrostatic charges are transmitted to the touch electrode, the touch control functions may be affected.

SUMMARY

In one aspect, the present invention provides a touch substrate having a touch electrode area and a peripheral area, comprising a base substrate and a mesh conductive layer in the peripheral area of the touch substrate; wherein the mesh conductive layer is configured to be connected to ground to discharge electrostatic charge in the touch substrate.

Optionally, the touch substrate further comprises a first touch electrode layer on the base substrate comprising a plurality of first touch electrodes in the touch electrode area; and a plurality of first touch electrode signal lines in the peripheral area respectively coupled to the plurality of first touch electrodes; wherein the mesh conductive layer encircles a first area having the first touch electrode layer and the plurality of first touch electrode signal lines.

Optionally, the touch substrate further comprises a ground line in the peripheral area, configured to be connected to ground to discharge electrostatic charge in the touch substrate; wherein the ground line encircles a second area having the first touch electrode layer and the plurality of first touch electrode signal lines; and the second area is in the first area.

Optionally, the mesh conductive layer is substantially throughout the peripheral area outside the first area.

Optionally, the mesh conductive layer is in a same layer as the plurality of first touch electrode signal lines.

Optionally, the touch substrate further comprises a first bridge layer comprising a plurality of first bridges; and a second touch electrode layer on the base substrate comprising a plurality of second touch electrodes in the touch electrode area; wherein the plurality of first touch electrodes and the plurality of second touch electrodes crossing over each other forming a plurality of intersections; each of the plurality of first touch electrodes comprises a plurality of first electrode blocks along a first direction, adjacent first electrode blocks spaced apart from each other at one of the plurality of intersections; each of the plurality of first bridges is at one of the plurality of intersections; the adjacent first electrode blocks are electrically connected to each other through one of the plurality of first bridges; and the plurality of first bridges, the plurality of first touch electrode signal lines, and the mesh conductive layer are in a same layer.

Optionally, the touch substrate further comprises an insulating layer between the second touch electrode layer and the first bridge layer; and a black matrix layer in the peripheral area; wherein the insulating layer is between the black matrix layer and the mesh conductive layer.

Optionally, the mesh conductive layer comprises a mesh structure composed of a plurality of strands of interwoven linear conductive wirings interconnected at a plurality of nodes, the interwoven linear conductive wirings intersecting each other to form a lattice.

Optionally, the lattice is one or a combination of lattices selected from the group consisting of a square lattice, a diamond-shaped lattice, a circular lattice, an elliptical lattice, a polygonal lattice, a rectangular-shaped lattice, a parallelogram shaped lattice, and a hexagonal lattice.

Optionally, the mesh conductive layer comprises at least two nodes along its narrowest width.

Optionally, the touch substrate further comprises at least one bonding lead in a driver integrated circuit bonding area, the at least one bonding lead electrically connected to the mesh conductive layer; wherein the mesh conductive layer is configured to be connected to ground through the at least one bonding lead.

Optionally, the touch substrate further comprises a conductive tape electrically connected to the mesh conductive layer, wherein the mesh conductive layer is configured to be connected to ground through the conductive tape.

Optionally, the mesh conductive layer comprises a first portion and a second portion spaced apart from each other, and the first portion and the second portion are electrically connected together by the conductive tape.

In another aspect, the present invention provides a touch control display apparatus comprising a touch substrate described herein.

Optionally, the touch control display apparatus has a driver integrated circuit bonding area for bonding a plurality of first touch electrode signal lines with a driver integrated circuit; the touch substrate further comprises at least one bonding lead in the driver integrated circuit bonding area, the at least one bonding lead electrically connected to the mesh conductive layer; and the mesh conductive layer is configured to be connected to ground through the at least one bonding lead.

Optionally, the touch control display apparatus further comprises a flexible printed circuit board electrically connected to the plurality of first touch electrode signal lines and the at least one bonding lead in the driver integrated circuit bonding area.

In another aspect, the present invention provides a method of fabricating a touch substrate having a touch electrode area and a peripheral area, comprising forming a mesh conductive layer on a base substrate and in the peripheral area of the touch substrate; wherein the mesh conductive layer is configured to be connected to ground to discharge electrostatic charge in the touch substrate.

Optionally, the method further comprises forming a first touch electrode layer on the base substrate comprising a plurality of first touch electrodes in the touch electrode area; and forming a plurality of first touch electrode signal lines in the peripheral area respectively coupled to the plurality of first touch electrodes; wherein the mesh conductive layer is formed to encircle a first area having the first touch electrode layer and the plurality of first touch electrode signal lines; and the mesh conductive layer and the plurality of first touch electrode signal lines are formed in a same layer and in a single patterning process with a same material.

Optionally, the method further comprises forming a ground line in the peripheral area, configured to be connected to ground to discharge electrostatic charge in the touch substrate; wherein the ground line is formed to encircle a second area having the first touch electrode layer and the plurality of first touch electrode signal lines, the second area being in the first area; and the mesh conductive layer, the ground line, and the plurality of first touch electrode signal lines are formed in a same layer and in a single patterning process with a same material.

Optionally, the method further comprises forming a first bridge layer comprising a plurality of first bridges; and forming a second touch electrode layer on the base substrate comprising a plurality of second touch electrodes in the touch electrode area; wherein the plurality of first touch electrodes and the plurality of second touch electrodes are formed to cross over each other forming a plurality of intersections; each of the plurality of first touch electrodes is formed to comprise a plurality of first electrode blocks along a first direction, adjacent first electrode blocks spaced apart from each other at one of the plurality of intersections; each of the plurality of first bridges is formed at one of the plurality of intersections; the adjacent first electrode blocks are formed to be electrically connected to each other through one of the plurality of first bridges; and the plurality of first bridges, the plurality of first touch electrode signal lines, and the mesh conductive layer are formed in a same layer and in a single patterning process with a same material.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments am presented herein for purpose of illustration and description only. It is not intended to be exhaustive or to be limited to the precise form disclosed.

During the manufacturing process of a touch panel, external electrostatic charges may be introduced into the touch panel. Similarly, during the use of the touch panel, electrostatic charges may be accumulated internally. Once theses external or internal electrostatic charges reach a certain level, the touch electrodes in the touch panel are prone to electrostatic damages, leading to malfunctions and defects in the touch panel. The electrostatic charges may be reduced by creating an anti-electrostatic manufacturing environment. It is, however, difficult to completely avoid electrostatic charges in the fabricating process.

Figure 1:
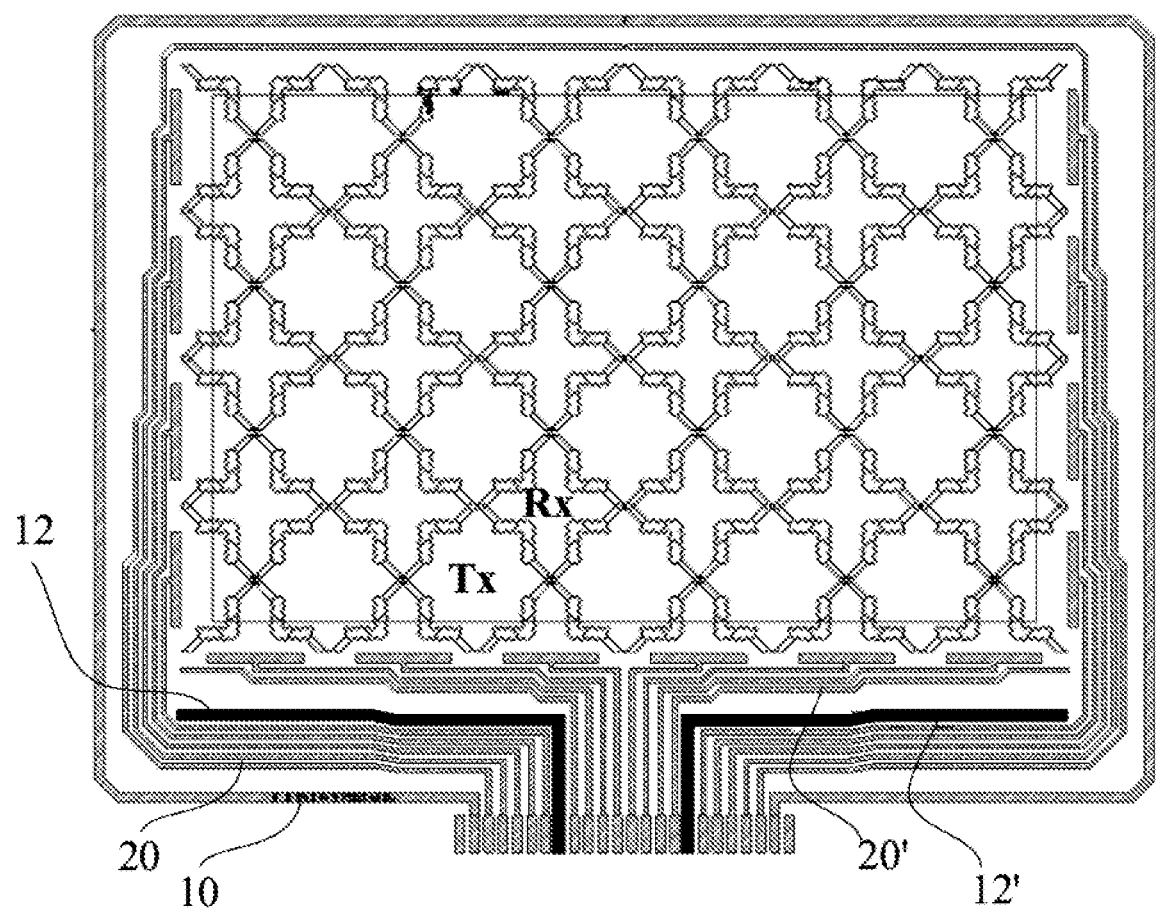
FIG. 1 is a diagram illustrating the layout of ground lines in a conventional touch substrate.
Figure 2:
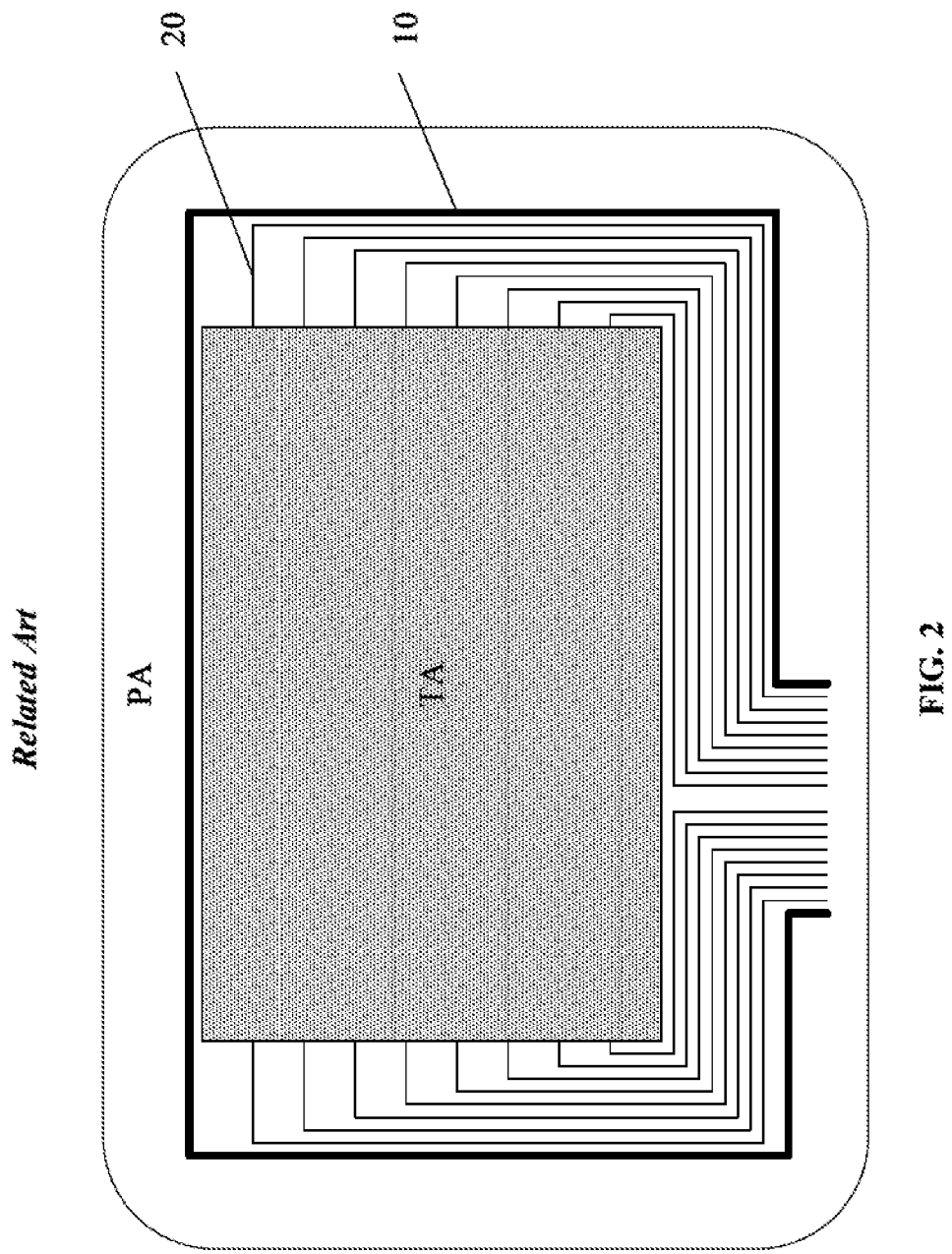
FIG. 2 is a simplified diagram illustrating the layout of ground lines in a conventional touch substrate.

FIG. 1 is a diagram illustrating the layout of ground lines in a conventional touch substrate. Referring to FIG. 1, the conventional touch substrate includes three ground lines. The ground line 10 encircles the touch substrate, discharging electrostatic charges surrounding the edges of the touch substrate to ground. Between a plurality of first touch electrode signal lines 20 (e.g., the touch driving signal lines) and a plurality of second touch electrode signal lines 20' (e.g., the touch sensing signal line), the touch substrate includes two other ground lines 12 and 12'. The ground lines 12 and 12' are separated from each other, and extend through only a limited area in the black matrix area. FIG. 1 shows a mutual capacitive type touch substrate having a plurality of touch sensing electrodes Rx and a plurality of touch driving electrodes Tx. FIG. 2 is a simplified diagram illustrating the layout of ground lines in a conventional touch substrate. The touch substrate in FIG. 2 may be a self-capacitive type touch substrate or a mutual capacitive type touch substrate. For simplicity, only the ground line 10 and the plurality of first touch electrode signal lines 20 are shown in FIG. 2. The touch substrate in FIG. 2 includes a peripheral area PA and a touch electrode area TA.

As shown in FIG. 1 and FIG. 2, the conventional touch substrates include at most three ground lines, each of which is composed of a single conductive line. When a large electrostatic discharge current occurs in the peripheral area (e.g., accumulated internally or introduced externally), the ground lines in the conventional touch substrate are prone to electrostatic breakdown, resulting in loss of electrostatic prevention function. When the ground line in the conventional touch substrates are damaged, the touch electrode signal lines are prone to the electrostatic breakdown, resulting in defects in the touch substrate.

Accordingly, the present disclosure provides, inter alia, a touch substrate, a touch control display apparatus, and a fabricating method thereof that substantially obviate one or more of the problems due to limitations and disadvantages of the related art. In one aspect, the present disclosure provides a touch substrate having a touch electrode area and a peripheral area. In some embodiments, the touch substrate includes a base substrate; and a mesh conductive layer in the peripheral area of the touch substrate. In the present touch substrate, the mesh conductive layer is configured to be connected to ground to discharge electrostatic charge in the touch substrate.

As used herein the term "peripheral area" refers to an area where various circuits and wires are provided to transmit signals to the touch substrate. To increase the transparency of the display apparatus, non-transparent or opaque components of the display apparatus (e.g., battery, printed circuit board, metal frame), can be disposed in the peripheral area rather than in the display areas.

As used herein the term "touch electrode area" refers an area of a touch substrate that includes a touch electrode layer, e.g., the touch electrode area is defined by the touch electrode layer. Optionally, a touch electrode layer includes touch electrodes (e.g., touch sensing electrodes and touch driving electrodes) and dummy electrodes. Optionally, the touch electrode area includes a plurality of touch electrodes and a plurality of dummy electrodes.

Figure 3:
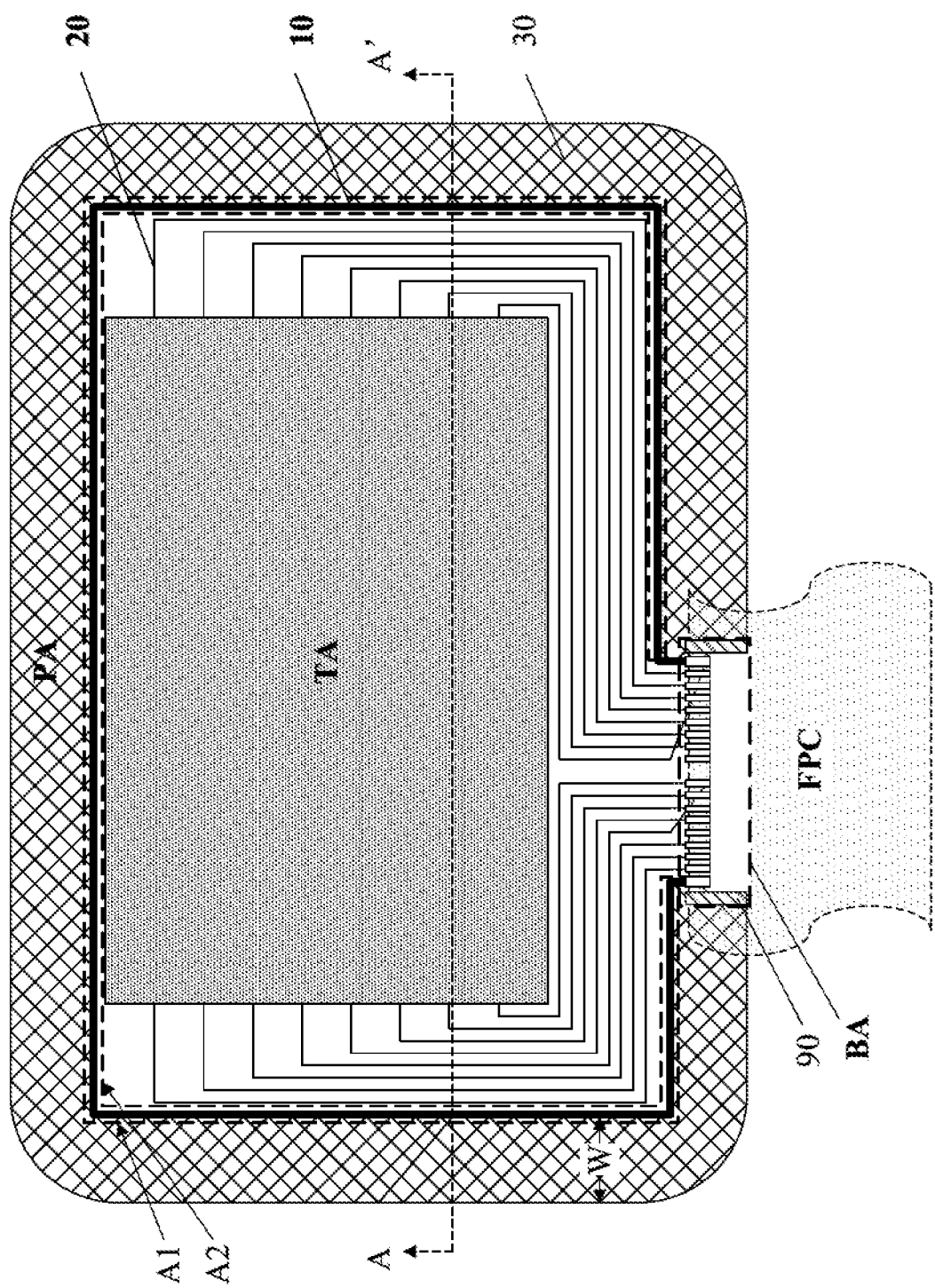
FIG. 3 is a schematic diagram illustrating a touch substrate in some embodiments according to the present disclosure.
Figure 4:
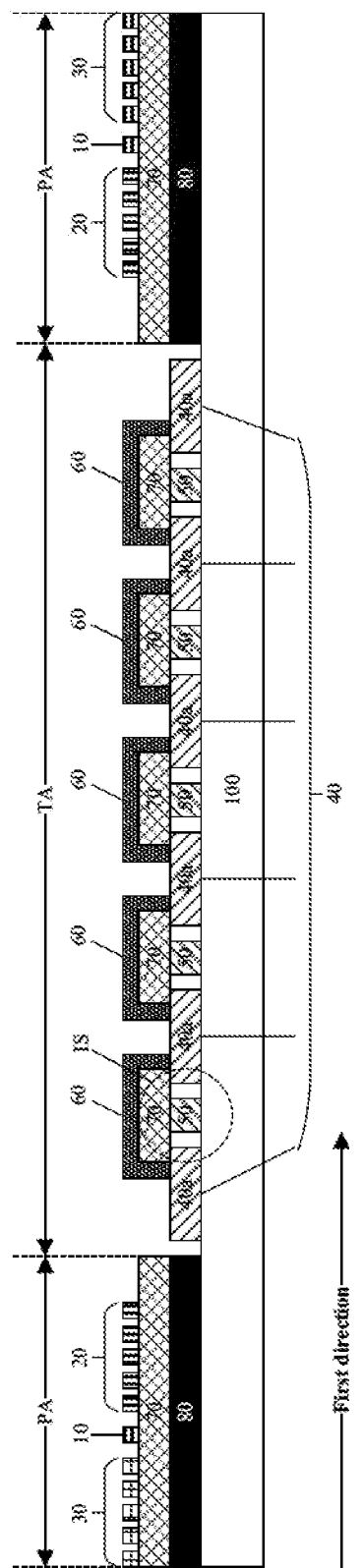
FIG. 4 is a cross-sectional view along A-A' direction of the touch substrate in FIG. 3.

FIG. 3 is a schematic diagram illustrating a touch substrate in some embodiments according to the present disclosure. FIG. 4 is a cross-sectional view along A-A' direction of the touch substrate in FIG. 3. Referring to FIG. 3 and FIG. 4, the touch substrate in some embodiments includes a touch electrode area TA and a peripheral area PA. Specifically, the touch substrate includes a base substrate 100, a mesh conductive layer 30 in the peripheral area PA of the touch substrate. The mesh conductive layer 30 is configured to be connected to ground to discharge electrostatic charge in the touch substrate. For example, FIG. 3 shows a flexible printed circuit board FPC. In a touch control display apparatus having a touch substrate of the present disclosure, the mesh conductive layer 30 may be electrically connected ground through the flexible printed circuit board FPC. Various other methods may be used to connect the mesh conductive layer 30 to ground. In one example, the mesh conductive layer 30 is connected to ground by a conductive tape.

In some embodiments, the touch substrate further includes a first touch electrode layer on the base substrate 100. The first touch electrode layer includes a plurality of first touch electrodes 40 in the touch electrode area TA. The touch substrate further includes a plurality of first touch electrode signal lines 20 in the peripheral area PA and respectively coupled to the plurality of first touch electrodes 40. As shown in FIG. 3, the mesh conductive layer 30 encircles a first area A1 having the first touch electrode layer and the plurality of first touch electrode signal lines 20. Optionally, the touch substrate further includes a second touch electrode layer and a plurality of second touch electrode signal lines (not shown in FIG. 3), and the first area A1 encircled by the mesh conductive layer 30 includes the first touch electrode layer, the second touch electrode layer, the plurality of first touch electrode signal lines 20, and the plurality of second touch electrode signal lines. Optionally, the first area A1 further includes additional ground lines (e.g., the ground lines 12 and 12' in FIG. 1).

As used herein, the term "encircle" refers to "to pass completely around." The term encircle is not limited to mean literally forming a circle, although it may include forming a circle, but may also include entirely or partially forming a perimeter around, entirely or partially surrounding, and/or being located at near an entire or partial periphery of that which is being encircled.

The mesh conductive layer 30 may be disposed in the peripheral area PA in any appropriate manner. The mesh conductive layer 30 is insulated from the touch electrode signal lines (e.g., the plurality of first touch electrode signal lines 20). In some embodiments, the touch substrate further includes a ground line 10 in the peripheral area PA. As discussed above, the first ground line 10 is configured to be connected to ground to discharge electrostatic charge in the touch substrate. As shown in FIG. 3, the ground line 10 encircles a second area A2 having the first touch electrode layer and the plurality of first touch electrode signal lines 20. The second area A2 is in the first area A1. Optionally, the mesh conductive layer 30 abuts the ground line 10. Optionally, the mesh conductive layer 30 is electrically connected to at least a part of the ground line 10. Optionally, the mesh conductive layer 30 is insulated from the ground line 10. Optionally, the mesh conductive layer 30 is spaced apart from the ground line 10.

The mesh conductive layer 30 at least partially occupies a portion of the peripheral area PA outside the first area A1. Optionally, the mesh conductive layer 30 is substantially throughout the peripheral area PA outside the first area A1, as illustrated in FIG. 3. By having a mesh conductive layer 30 that maximally occupies the peripheral area PA, the mesh conductive layer 30 can effectively discharge electrostatic charges in the touch substrate, particularly the electrostatic charges introduced externally or accumulated internally in the peripheral area PA.

Figure 5:
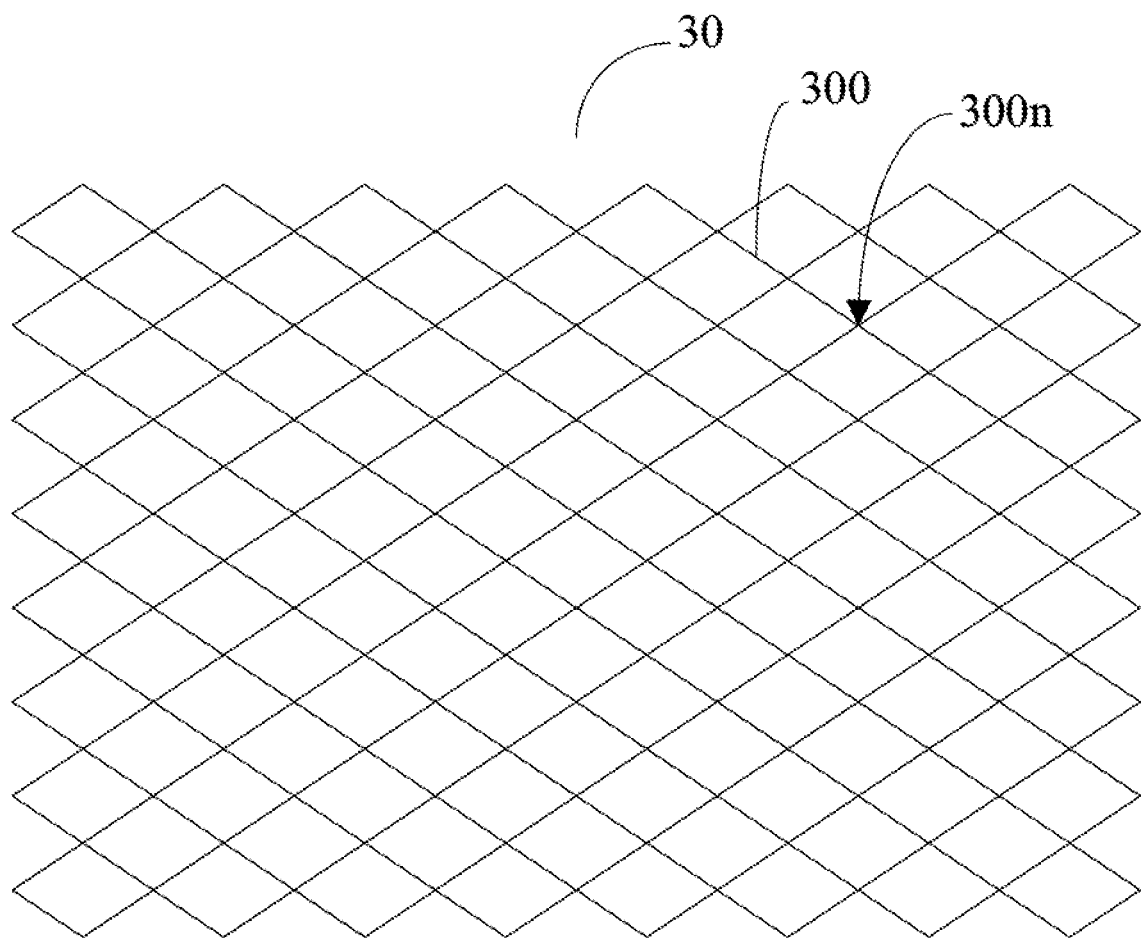
FIG. 5 is a schematic diagram illustrating a portion of a mesh conductive layer in some embodiments according to the present disclosure.
Figure 6:
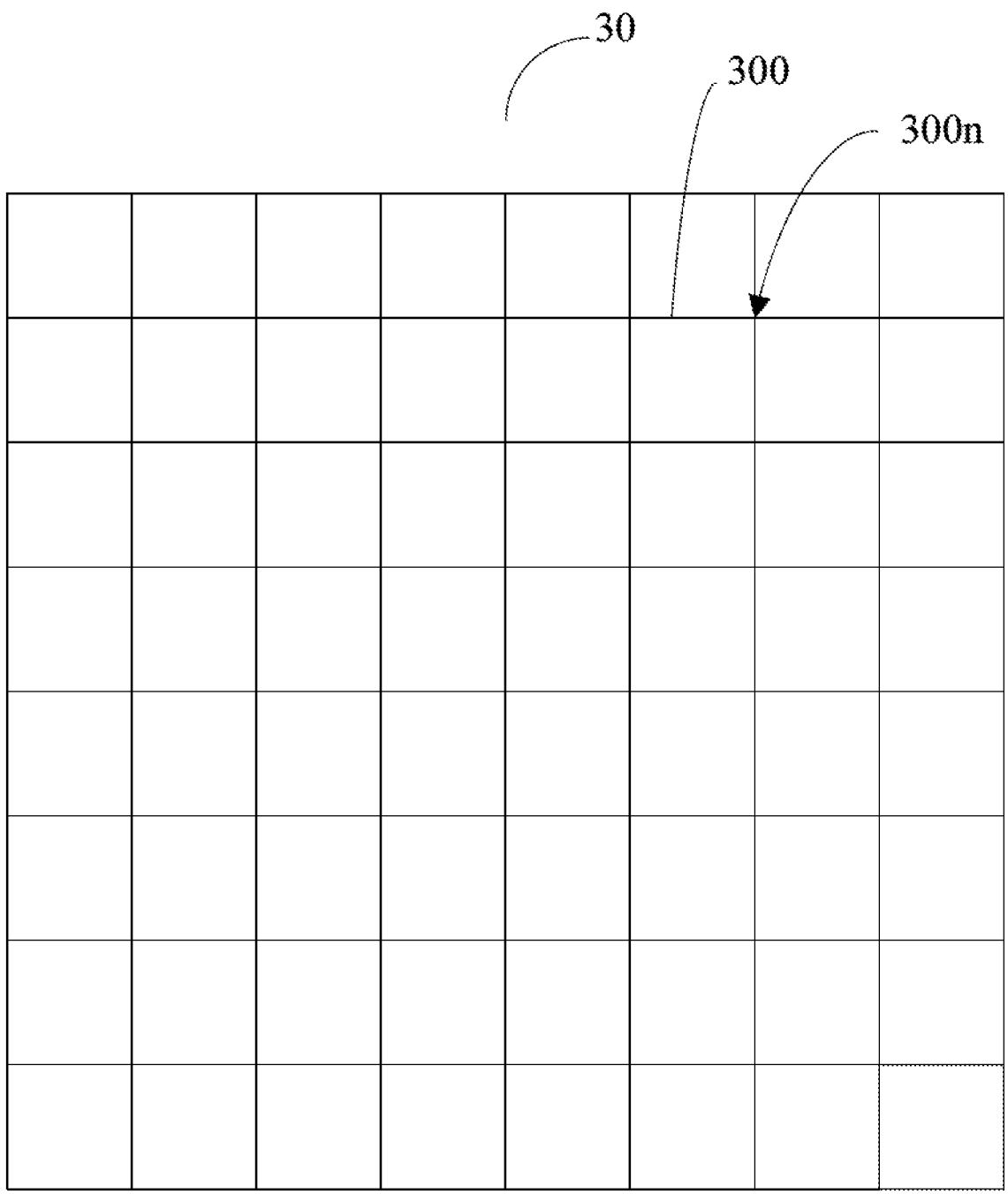
FIG. 6 is a schematic diagram illustrating a portion of a mesh conductive layer in some embodiments according to the present disclosure.
Figure 7:
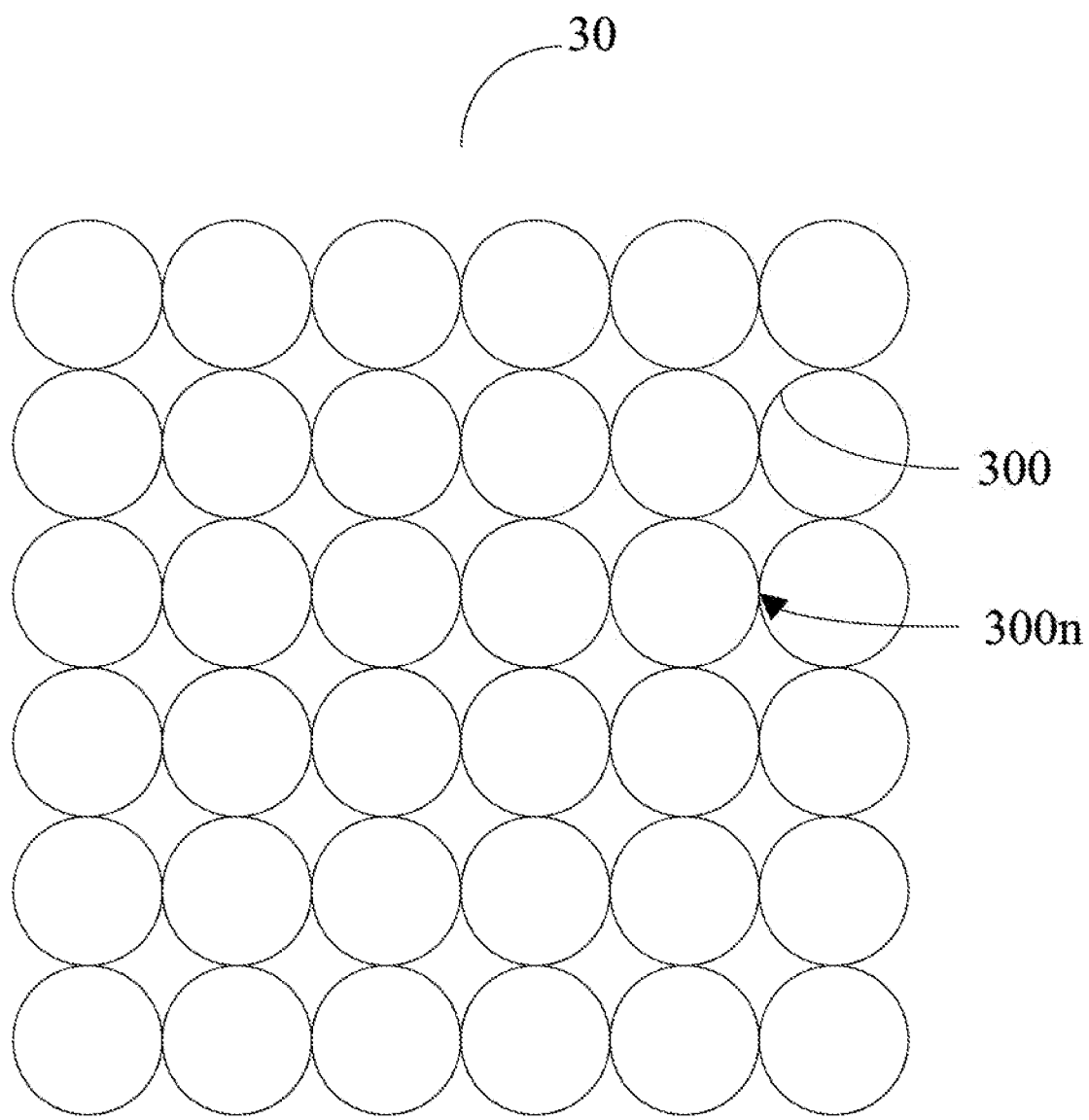
FIG. 7 is a schematic diagram illustrating a portion of a mesh conductive layer in some embodiments according to the present disclosure.

In some embodiments, the mesh conductive layer 30 includes a mesh structure composed of a plurality of strands of interwoven linear conductive wirings interconnected at a plurality of nodes. The interwoven linear conductive wirings intersect each other to form a lattice. FIG. 5 is a schematic diagram illustrating a portion of a mesh conductive layer in some embodiments according to the present disclosure. FIG. 6 is a schematic diagram illustrating a portion of a mesh conductive layer in some embodiments according to the present disclosure. FIG. 7 is a schematic diagram illustrating a portion of a mesh conductive layer in some embodiments according to the present disclosure. Referring to FIGS. 5 to 7, the mesh conductive layer 30 includes a plurality of strands of interwoven linear conductive wirings 300. The plurality of strands of interwoven linear conductive wirings 300 intersect each other and are interconnected at a plurality of nodes 300n.

Various appropriate materials may be used for making the mesh conductive layer 30. Examples of conductive materials suitable for making the mesh conductive layer 30 include, but are not limited to, a metal mesh, a silver nano wire, a carbon nano tube, a nano mesh, graphene, and conductive polymers such as poly(3,4-ethylenedioxythiophene) polystyrene sulfonate (PEDOT:PSS). Optionally, the mesh conductive layer 30 is made of a metal mesh such as a nano-silver mesh.

Various appropriate mesh patterns may be used for making the mesh conductive layer 30. Examples of appropriate mesh patterns include, but are not limited to, grid (tetragonal), triangular, polygonal, square, circular and elliptical. The mesh conductive layer 30 may have one or more first mesh pattern. The mesh conductive layer 30 may have a lattice of any appropriate shape. Optionally, the lattice of the mesh conductive layer 30 is one or a combination of lattices selected from the group consisting of a square lattice, a diamond-shaped lattice, a circular lattice, an elliptical lattice, a polygonal lattice, a rectangular-shaped lattice, a parallelogram shaped lattice, and a hexagonal lattice. FIG. 5 illustrates a portion of a mesh conductive layer 30 having a diamond shaped lattice. FIG. 6 illustrates a portion of a mesh conductive layer 30 having a square lattice. FIG. 7 illustrates a portion of a mesh conductive layer 30 having a circular lattice.

Various appropriate mesh aperture ratios, mesh line widths, mesh line thicknesses, and opening widths may be used for making the first mesh electrode layer and the second mesh electrode layer. The mesh aperture ratios, mesh line widths, mesh line thicknesses, and opening widths may be selected to achieve optimal electrical conductivity and low resistance.

Referring to FIG. 3 again, the mesh conductive layer 30 has a width W along a direction pointing from the peripheral area PA to the touch electrode area TA. The width W is at least in part depending on the width of the frame of the touch substrate, or the width of the frame of a touch control display panel having the touch substrate. For example, the width of the frame of a touch control display panel having the touch substrate is in a range of approximately 1 mm to approximately 10 mm. In a portion of the frame having a narrow width, the mesh conductive layer 30 correspondingly has a relatively small width W. In a portion of the frame having a large width, the mesh conductive layer 30 may have a relatively larger width W. Optionally, the mesh conductive layer 30 includes at least two nodes 300$n$ along its narrowest width. Optionally, the mesh conductive layer 30 substantially surrounds the peripheral area PA except for the portion having the driver integrated circuit bonding area of the peripheral area PA. Optionally, the touch substrate is a touch substrate in a narrow-frame touch control display panel, and one or more portions of the frame is too narrow to allow convenient disposition of the mesh conductive layer 30, resulting in the mesh conductive layer 30 breaking into two parts at each of the one or more portions of the frame. Optionally, the touch substrate further includes one or more conductive tape electrically connected to the mesh conductive layer 30 and electrically connecting two parts of the mesh conductive layer 30 at each of the one or more narrow portions of the frame. In one example, the touch substrate includes a conductive tape electrically connected to the mesh conductive layer, and the mesh conductive layer is configured to be connected to ground through the conductive tape. In another example, the mesh conductive layer comprises a first portion and a second portion spaced apart from each other; and the first portion and the second portion are electrically connected together by the conductive tape.

Various appropriate methods may be used to connect the mesh conductive layer 30 to ground. Referring to FIG. 3, the touch substrate in some embodiments further includes at least one bonding lead 90 in a driver integrated circuit bonding area BA. The at least one bonding lead 90 is electrically connected to the mesh conductive layer 30. The mesh conductive layer 30 is configured to be connected to ground through the at least one bonding lead 90. In one example, the at least one bonding lead 90 is connected to a ground line in a flexible circuit board in a touch control display apparatus having the present touch substrate.

As further detailed in the fabricating method described below, in some embodiments, the mesh conductive layer 30 is in a same layer as the plurality of first touch electrode signal lines 20. By having the mesh conductive layer 30 in a same layer as other conductive line layers, the fabricating process can be greatly simplified. As used herein, the term "same layer" refers to the relationship between the layers simultaneously formed in the same step. In one example, the mesh conductive layer 30 and the plurality of first touch electrode signal lines 20 are in a same layer when they are formed as a result of one or more steps of a same patterning process performed in a same layer of material. In another example, the mesh conductive layer 30 and the plurality of first touch electrode signal lines 20 can be formed in a same layer by simultaneously performing the step of forming the mesh conductive layer 30 and the step of forming the plurality of first touch electrode signal lines 20. The term "same layer" does not always mean that the thickness of the layer or the height of the layer in a cross-sectional view is the same.

In some embodiments, and referring to FIG. 3 and FIG. 4 again, the touch substrate includes a first touch electrode layer on the base substrate 100 having a plurality of first touch electrodes 40 in the touch electrode area TA; a plurality of first touch electrode signal lines 20 in the peripheral area PA respectively coupled to the plurality of first touch electrodes 40; a second touch electrode layer on the base substrate having a plurality of second touch electrodes 50 in the touch electrode area TA; and a first bridge layer having a plurality of first bridges 60. The first bridge layer is insulated from the second touch electrode layer by an insulating layer 70. The plurality of first touch electrodes 40 and the plurality of second touch electrodes 50 cross over each other forming a plurality of intersections IS. As shown in FIG. 4, each of the plurality of first touch electrodes 40 includes a plurality of first electrode blocks 40$a$ along a first direction, adjacent first electrode blocks 40$a$ spaced apart from each other at one of the plurality of intersections IS. Each of the plurality of first bridges 60 is at one of the plurality of intersections IS, connecting adjacent first electrode blocks of the plurality of first electrode blocks 40$a$ in each of the plurality of first touch electrodes 40.

As further detailed in the fabricating method described below, in some embodiments, the mesh conductive layer 30 is in a same layer as the plurality of first touch electrode signal lines 20, and the plurality of first bridges 60. By having the mesh conductive layer 30 in a same layer as the plurality of first touch electrode signal lines 20 and the plurality of first bridges 60, the fabricating process can be greatly simplified. In some embodiments, the touch substrate further includes a plurality of second touch electrode signal lines (see, e.g., the plurality of second touch electrode signal lines 20' in FIG. 1) in the peripheral area PA respectively coupled to the plurality of second touch electrodes 50. Optionally, the mesh conductive layer 30 is in a same layer as the plurality of first touch electrode signal lines 20, the plurality of second touch electrode signal lines, and the plurality of first bridges 60. Optionally, the mesh conductive layer 30 is in a same layer as the plurality of first touch electrode signal lines 20, the plurality of second touch electrode signal lines, the ground line 10, and the plurality of first bridges 60.

Referring to FIG. 4, the touch substrate in some embodiments further includes a black matrix layer 80 in the peripheral area PA. The black matrix layer 80 is on a side of the insulating layer 70 distal to the mesh conductive layer 30, the plurality of first touch electrode signal lines 20, and the ground line 10.

In another aspect, the present disclosure provides a method of fabricating a touch substrate having a touch electrode area and a peripheral area. In some embodiments, the method includes forming a mesh conductive layer on a base substrate and in the peripheral area of the touch substrate. The mesh conductive layer is configured to be connected to ground to discharge electrostatic charge in the touch substrate. The method in some embodiments further includes forming a first touch electrode layer on the base substrate having a plurality of first touch electrodes in the touch electrode area; and forming a plurality of first touch electrode signal lines in the peripheral area respectively coupled to the plurality of first touch electrodes. Optionally, the mesh conductive layer is formed to encircle a first area having the first touch electrode layer and the plurality of first touch electrode signal lines. Optionally, the mesh conductive layer and the plurality of first touch electrode signal lines are formed in a same layer and in a single patterning process with a same material.

In some embodiments, the method further includes forming a ground line in the peripheral area, configured to be connected to ground to discharge electrostatic charge in the touch substrate. The ground line is formed to encircle a second area having the first touch electrode layer and the plurality of first touch electrode signal lines, the second area being in the first area. Optionally, the mesh conductive layer, the ground line, and the plurality of first touch electrode signal lines are formed in a same layer and in a single patterning process with a same material. Optionally, the mesh conductive layer is formed substantially throughout the peripheral area outside the first area.

In some embodiments, the method further includes forming a first bridge layer having a plurality of first bridges; and forming a second touch electrode layer on the base substrate having a plurality of second touch electrodes in the touch electrode area. The plurality of first touch electrodes and the plurality of second touch electrodes are formed to cross over each other forming a plurality of intersections. Each of the plurality of first touch electrodes is formed to include a plurality of first electrode blocks along a first direction, adjacent first electrode blocks spaced apart from each other at one of the plurality of intersections. Each of the plurality of first bridges is formed at one of the plurality of intersections. The adjacent first electrode blocks are formed to be electrically connected to each other through one of the plurality of first bridges. Optionally, the plurality of first bridges, the plurality of first touch electrode signal lines, and the mesh conductive layer are formed in a same layer and in a single patterning process with a same material.

Optionally, the method further includes forming an insulating layer between the second touch electrode layer and the first bridge layer; and forming a black matrix layer in the peripheral area. Optionally, the insulating layer is formed between the black matrix layer and the mesh conductive layer.

Optionally, the mesh conductive layer is formed to include a mesh structure composed of a plurality of strands of interwoven linear conductive wirings interconnected at a plurality of nodes, the interwoven linear conductive wirings intersecting each other to form a lattice. Optionally, the lattice is one or a combination of lattices selected from the group consisting of a square lattice, a diamond-shaped lattice, a circular lattice, an elliptical lattice, a polygonal lattice, a rectangular-shaped lattice, a parallelogram shaped lattice, and a hexagonal lattice. Optionally, the mesh conductive layer includes at least two nodes along its narrowest width.

Optionally, the method further includes forming at least one bonding lead in a driver integrated circuit bonding area, the at least one bonding lead formed to be electrically connected to the mesh conductive layer. The mesh conductive layer is configured to be connected to ground through the at least one bonding lead.

Optionally, the method further includes forming a conductive tape electrically connected to the mesh conductive layer. Optionally, the mesh conductive layer is configured to be connected to ground through the conductive tape. Optionally, the mesh conductive layer is formed to include a first portion and a second portion spaced apart from each other, and the conductive tape is formed to electrically connecting the first portion and the second portion together.

Figure 8:
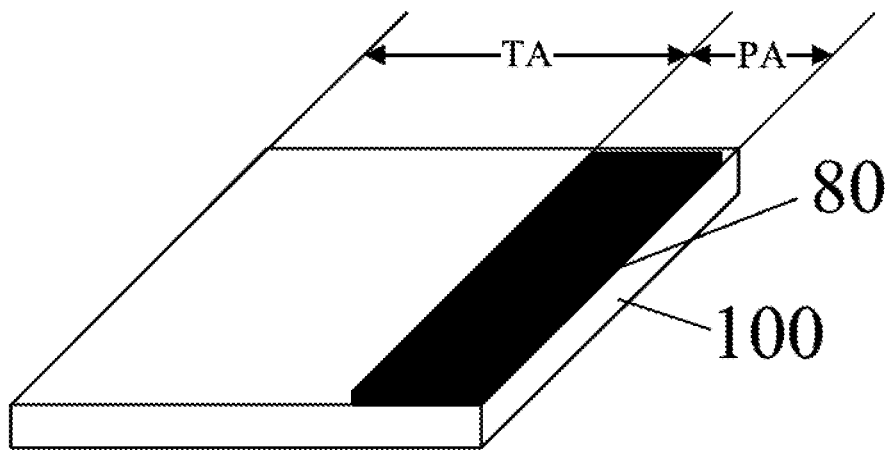
FIGS. 8 to 11 illustrate a method of fabricating a touch substrate in some embodiments according to the present disclosure.
Figure 9:
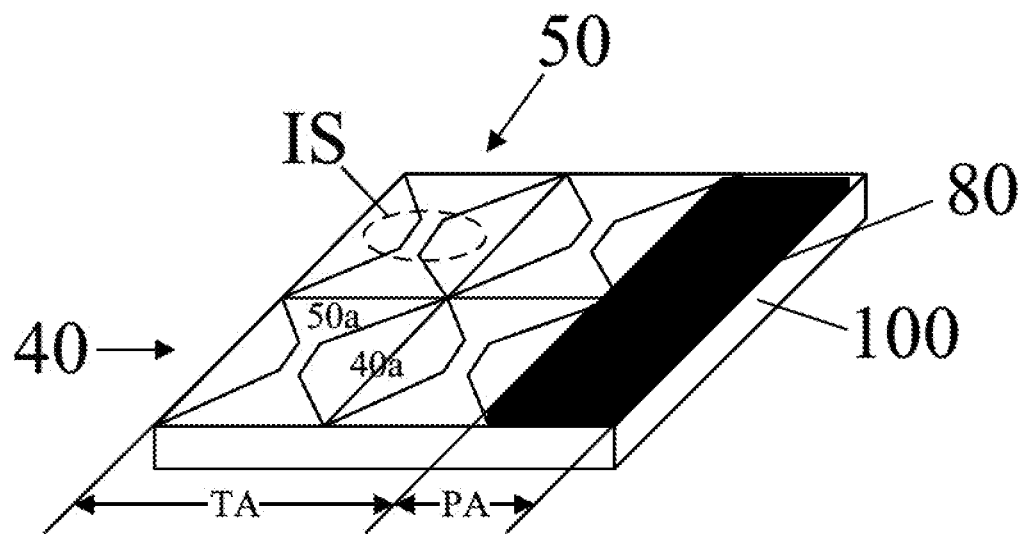

FIGS. 8 to 11 illustrate a method of fabricating a touch substrate in some embodiments according to the present disclosure. Referring to FIG. 8, the method in some embodiments includes forming a black matrix layer 80 in a peripheral area PA on a base substrate 100. Referring to FIG. 9, the method in some embodiments further includes forming a first touch electrode layer and a second touch electrode layer in a touch electrode area TA. The first touch electrode layer is formed to include a plurality of first touch electrode 40, each of which includes a plurality of first touch electrode blocks 40a. The second touch electrode layer is formed to include a plurality of second touch electrode 50, each of which includes a plurality of second touch electrode blocks 50a. The plurality of first touch electrodes 40 and the plurality of second touch electrodes 50 are formed to cross over each other forming a plurality of intersections IS.

Figure 10:
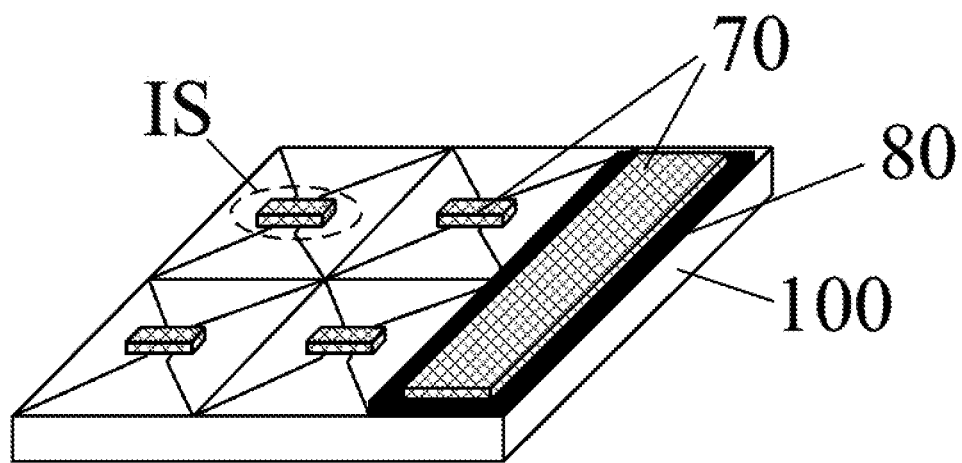

Referring to FIG. 10, the method in some embodiments further includes forming an insulating layer 70 on a side of the black matrix layer 80, the first touch electrode layer, and the second touch electrode layer distal to the base substrate 100. In the touch electrode area TA, the insulating layer 70 is formed in the plurality of intersections IS.

Figure 11:
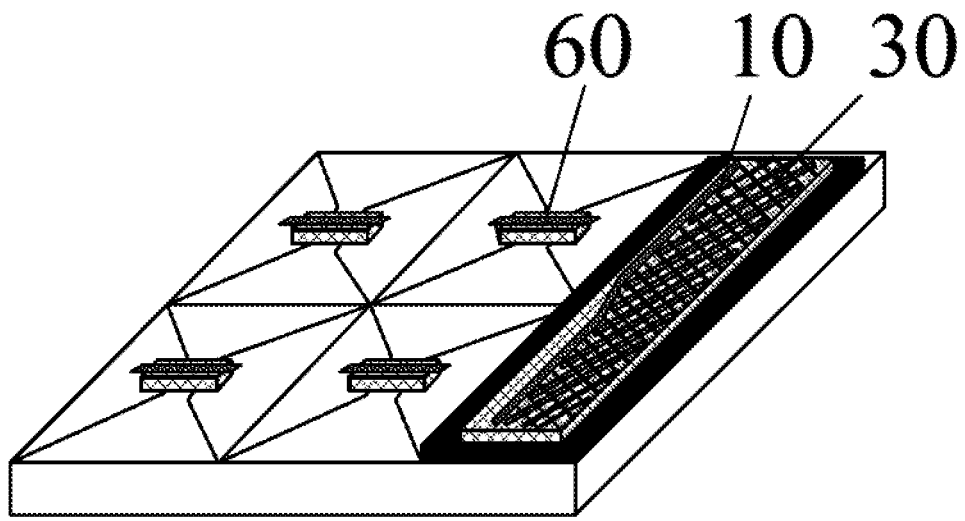

Referring to FIG. 11, the method in some embodiments further includes forming, in a single layer, at least a mesh conductive layer 30, a ground line 10, and a first bridge layer having a plurality of first bridges 60, on a side of the insulating layer 70 distal to the base substrate 100. The mesh conductive layer 30, the ground line 10, and the first bridge layer are formed in a same layer and in a single patterning process with a same material. Optionally, the single layer further includes a plurality of first touch electrode signal lines and a plurality of second touch electrode signal lines.

In another aspect, the present disclosure provides a touch control display apparatus having a touch substrate described herein or fabricated by a method described herein. Optionally, the touch control display apparatus is an add-on type touch control display apparatus, e.g., a one-glass-solution type touch control display apparatus or a glass-film-film type touch control display apparatus. Optionally, the touch control display apparatus is an on-cell type touch control display apparatus. Examples of appropriate touch control display apparatuses include, but are not limited to, an electronic paper, a mobile phone, a tablet computer, a television, a monitor, a notebook computer, a digital album, a GPS, etc.

In some embodiments, the touch control display apparatus has a driver integrated circuit bonding area for bonding a plurality of first touch electrode signal lines with a driver integrated circuit. The touch substrate further includes at least one bonding lead in the driver integrated circuit bonding area, the at least one bonding lead electrically connected to the mesh conductive layer. The mesh conductive layer is configured to be connected to ground through the at least one bonding lead. Optionally, the touch control display apparatus further includes a flexible printed circuit board electrically connected to the plurality of first touch electrode signal lines and the at least one bonding lead in the driver integrated circuit bonding area.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A touch substrate having a touch electrode area and a peripheral area, comprising:
   a base substrate;
   a mesh conductive layer in the peripheral area of the touch substrate;
   a first touch electrode layer on the base substrate comprising a plurality of first touch electrodes in the touch electrode area; and
   a plurality of first touch electrode signal lines in the peripheral area respectively coupled to the plurality of first touch electrodes;
   wherein the mesh conductive layer is configured to be connected to ground to discharge electrostatic charge in the touch substrate; and
   the mesh conductive layer encircles a first area having the first touch electrode layer and the plurality of first touch electrode signal lines.

2. The touch substrate of claim 1, further comprising a ground line in the peripheral area, configured to be connected to ground to discharge electrostatic charge in the touch substrate;
   wherein the ground line encircles a second area having the first touch electrode layer and the plurality of first touch electrode signal lines; and
   the second area is in the first area.

3. The touch substrate of claim 1, wherein the mesh conductive layer is substantially throughout the peripheral area outside the first area.

4. The touch substrate of claim 1, wherein the mesh conductive layer is in a same layer as the plurality of first touch electrode signal lines.

5. The touch substrate of claim 1, further comprising
   a first bridge layer comprising a plurality of first bridges; and
   a second touch electrode layer on the base substrate comprising a plurality of second touch electrodes in the touch electrode area;
   wherein the plurality of first touch electrodes and the plurality of second touch electrodes crossing over each other forming a plurality of intersections;
   each of the plurality of first touch electrodes comprises a plurality of first electrode blocks along a first direction, adjacent first electrode blocks spaced apart from each other at one of the plurality of intersections;
   each of the plurality of first bridges is at one of the plurality of intersections;
   the adjacent first electrode blocks are electrically connected to each other through one of the plurality of first bridges; and
   the plurality of first bridges, the plurality of first touch electrode signal lines, and the mesh conductive layer are in a same layer.

6. The touch substrate of claim 5, further comprising an insulating layer between the second touch electrode layer and the first bridge layer; and
   a black matrix layer in the peripheral area;
   wherein the insulating layer is between the black matrix layer and the mesh conductive layer.

7. The touch substrate of claim 1, wherein the mesh conductive layer comprises a mesh structure composed of a plurality of strands of interwoven linear conductive wirings interconnected at a plurality of nodes, the interwoven linear conductive wirings intersecting each other to form a lattice.

8. The touch substrate of claim 7, wherein the lattice is one or a combination of lattices selected from the group consisting of a square lattice, a diamond-shaped lattice, a circular lattice, an elliptical lattice, a polygonal lattice, a rectangular-shaped lattice, a parallelogram shaped lattice, and a hexagonal lattice.

9. The touch substrate of claim 7, wherein the mesh conductive layer comprises at least two nodes along its narrowest width.

10. A touch substrate having a touch electrode area and a peripheral area, comprising:
    a base substrate;
    a mesh conductive layer in the peripheral area of the touch substrate; and
    at least one bonding lead in a driver integrated circuit bonding area, the at least one bonding lead electrically connected to the mesh conductive layer;
    wherein the mesh conductive layer is configured to be connected to ground to discharge electrostatic charge in the touch substrate; and
    the mesh conductive layer is configured to be connected to ground through the at least one bonding lead.

11. The touch substrate of claim 1, further comprising a conductive tape electrically connected to the mesh conductive layer;
    wherein the mesh conductive layer is configured to be connected to ground through the conductive tape.

12. The touch substrate of claim 11, wherein the mesh conductive layer comprises a first portion and a second portion spaced apart from each other; and
    the first portion and the second portion are electrically connected together by the conductive tape.

13. A touch control display apparatus, comprising a touch substrate of claim 1.

14. The touch control display apparatus of claim 13,
    wherein the touch control display apparatus has a driver integrated circuit bonding area for bonding a plurality of first touch electrode signal lines with a driver integrated circuit;
    the touch substrate further comprises at least one bonding lead in the driver integrated circuit bonding area, the at least one bonding lead electrically connected to the mesh conductive layer; and the mesh conductive layer is configured to be connected to ground through the at least one bonding lead.

15. The touch control display apparatus of claim 14, further comprising a flexible printed circuit board electrically connected to the plurality of first touch electrode signal lines and the at least one bonding lead in the driver integrated circuit bonding area.

16. A method of fabricating a touch substrate having a touch electrode area and a peripheral area, comprising:

forming a mesh conductive layer on a base substrate and in the peripheral area of the touch substrate;

forming a first touch electrode layer on the base substrate, the first touch electrode layer formed to comprise a plurality of first touch electrodes in the touch electrode area; and forming a plurality of first touch electrode signal lines in the peripheral area respectively coupled to the plurality of first touch electrodes;

wherein the mesh conductive layer is configured to be connected to ground to discharge electrostatic charge in the touch substrate; and the mesh conductive layer is formed to encircle a first area having the first touch electrode layer and the plurality of first touch electrode signal lines.

17. The method of claim 16, wherein the mesh conductive layer and the plurality of first touch electrode signal lines are formed in a same layer and in a single patterning process with a same material.

18. The method of claim 17, further comprising:

forming a ground line in the peripheral area, configured to be connected to ground to discharge electrostatic charge in the touch substrate;

wherein the ground line is formed to encircle a second area having the first touch electrode layer and the plurality of first touch electrode signal lines, the second area being in the first area; and the mesh conductive layer, the ground line, and the plurality of first touch electrode signal lines are formed in a same layer and in a single patterning process with a same material.

19. The method of claim 17, further comprising:

forming a first bridge layer comprising a plurality of first bridges; and forming a second touch electrode layer on the base substrate comprising a plurality of second touch electrodes in the touch electrode area;

wherein the plurality of first touch electrodes and the plurality of second touch electrodes are formed to cross over each other forming a plurality of intersections;

each of the plurality of first touch electrodes is formed to comprise a plurality of first electrode blocks along a first direction, adjacent first electrode blocks spaced apart from each other at one of the plurality of intersections;

each of the plurality of first bridges is formed at one of the plurality of intersections;

the adjacent first electrode blocks are formed to be electrically connected to each other through one of the plurality of first bridges; and the plurality of first bridges, the plurality of first touch electrode signal lines, and the mesh conductive layer are formed in a same layer and in a single patterning process with a same material.

\* \* \* \* \*